United States Patent [19]

Brunken

[11] Patent Number: 4,662,495
[45] Date of Patent: May 5, 1987

[54] FLUID-FRICTION COUPLING FOR A COOLING FAN OF AN INTERNAL COMBUSTION ENGINE

[75] Inventor: Gerd Brunken, Dittelbrunn, Fed. Rep. of Germany

[73] Assignee: Fichtel & Sachs AG, Schweinfurt, Fed. Rep. of Germany

[21] Appl. No.: 834,648

[22] Filed: Feb. 27, 1986

Related U.S. Application Data

[63] Continuation of Ser. No. 561,668, Dec. 15, 1983, abandoned.

[30] Foreign Application Priority Data

Dec. 17, 1982 [DE] Fed. Rep. of Germany ....... 3246783

[51] Int. Cl.⁴ ..................... F16D 35/00; F16D 43/25
[52] U.S. Cl. .................. 192/58 B; 192/82 T
[58] Field of Search ............................ 192/58 B, 82 T

[56] References Cited

U.S. PATENT DOCUMENTS 2,838,244  6/1958  Oldberg ............................... 236/35
3,339,689  9/1967  Sutaruk .
3,419,122  12/1968  Connelly .
4,007,819  2/1977  Maci ............................. 192/82 T X
4,381,051  4/1983  Kikuchi ....................... 192/58 B X
4,423,803  1/1984  Malloy .......................... 192/82 T X

FOREIGN PATENT DOCUMENTS 1425244  8/1970  Fed. Rep. of Germany .
2212367  9/1973  Fed. Rep. of Germany .
2803975  8/1978  Fed. Rep. of Germany .
1379860  1/1963  France .
 994954  6/1965  United Kingdom .
2071283  2/1981  United Kingdom .

Primary Examiner—A. Michael Chambers
Assistant Examiner—John C. Fox
Attorney, Agent, or Firm—Toren, McGeady and Goldberg

[57] ABSTRACT

The invention relates to a fluid-friction coupling for the cooling fan of an internal combustion engine. The torque transmission of the coupling is controlled in dependence upon the working temperature of the internal combustion engine. In order to suppress undesiredly high temperatures within the coupling at excessively high drive-input rotation speed, the torque transmission and thus the power loss are reduced when the working temperature of the coupling rises.

7 Claims, 4 Drawing Figures

_ _ _

FLUID-FRICTION COUPLING FOR A COOLING FAN OF AN INTERNAL COMBUSTION ENGINE

This is a continuation of application Ser. No. 561,668, filed Dec. 15, 1983, now abandoned.

BACKGROUND TO THE INVENTION

The invention relates to a fluid-friction coupling or viscous coupling for the drive of a cooling fan of an internal combustion engine.

STATEMENT OF PRIOR ART

Viscous fan couplings of the most various styles of construction are known in which the torque transmittable by the coupling is controlled in dependence upon the working temperature of the internal combustion engine. By way of example according to U.S. Pat. No. 2,838,244 the distance between two components forming the shearing surfaces is varied in dependence upon temperature. In other designs the filling level of the viscous fluid is regulated temperature-dependently. Thus by way of example according to DE-B- No. 1,425,244 the chamber in which the viscous fluid is situated is varied by axial displacement of a wall so that the size of the effectively wetted shearing surfaces is varied. Another type of filling level regulation is known for example from DE-A- No. 2,803,975, in which viscous fluid is pumped continuously out of a working chamber into a reservoir and the inflow from the reservoir into the working chamber is controlled in temperature-dependence. Finally from German Pat. No. 2,212,367 a viscous fan coupling is known in which the transmitted torque is controlled in dependence upon two different parameters. The coupling comprises a driven rotor which is formed as a partition between a reservoir chamber and a working chamber for the viscous fluid. In this partition a valve opening is provided the size of which can be controlled in dependence upon both rotation rate and temperature. The rotation-rate-dependent control serves to reduce the transmitted torque above a pre-determined drive input rotation rate. The temperature-dependent control is intended to react to the cooling air coming from the radiator of the internal combustion engine and to effect an increase of the torque transmission with increasing temperature. The transmittable torque is raised with increasing temperature.

All these viscous fan couplings are dimensioned so that irrespective of the drive rotation rate at maximum transmitted torque a relatively low drive-output rotation rate is maintained or not exceeded. In this case at high drive-input rotation rates excessively high slip values occur, leading to an undesiredly high heat generation within the viscous fan coupling. In order to dimension a viscous fan coupling acceptably even for such extreme cases all the materials utilised, including the viscous fluid, would have to be correspondingly temperature-stable and furthermore precautions would have to be taken to limit the bearing play, which increases by reason of different thermal expansions.

OBJECT OF THE INVENTION

An object of the present invention is to provide a viscous fan coupling which, with a minimum of expense, avoids the generation of undesiredly high temperatures without detriment to the operating properties of the fan coupling.

SUMMARY OF THE INVENTION

According to the invention there is provided a fluid-friction coupling for a cooling fan of an internal combustion engine, comprising a housing which encloses a working chamber at least partially filled with viscous fluid, a rotor arranged in the working chamber and rotatable in relation to the housing, shearing surfaces on the housing for one part and the rotor on the other, which surfaces lie opposite to one another in the working chamber, forming shear gaps, a first torque control device responding to the working temperature of the internal combustion engine, which device with increasing temperature raises the torque transmitted between the shearing surfaces of the housing and the rotor, and a second torque control device responding to the working temperature of the fluid-friction coupling, which device with rising temperature reduces the torque transmitted between the shearing surfaces of the housing and of the rotor independently of the first torque control device above a pre-determined value of the working temperature of the fluid-friction coupling.

Within the scope of the invention the transmittable torque is controlled not only in dependence upon the working temperature of the internal combustion engine but additionally in dependence upon the working temperature of the viscous fan coupling itself, namely in a manner such that the transmittable torque is reduced with rising working temperature. In this way the drive-output rotation rate of the fan coupling can be reduced which, while it increases the slip of the coupling, at the same time however reduces the power consumption of the fan and thus the power loss of the coupling which is converted into heat and determines the working temperature of the coupling. This measure suppresses any undesired temperature rise within the viscous fan coupling.

Within the scope of the invention it is in principle immaterial in which manner within the viscous fan coupling the transmittable torque can be varied. In the case of viscous fan couplings with variation of the filling level of the viscous fluid in the shear gaps a bimetallic element is arranged preferredly in or on the housing of the viscous fan coupling and effects a reduction of filling level when the working temperature rises. In this case a valve device is expediently controlled both by a first, externally situated bimetallic element and by a second, internally situated bimetallic element, in common. Thus the construction expense is reduced to a minimum.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF DRAWINGS

The invention will be explained in greater detail below by reference to an example of embodiment. In detail

DESCRIPTION OF THE PREFERRED EMBODIMENT

Figure 1:
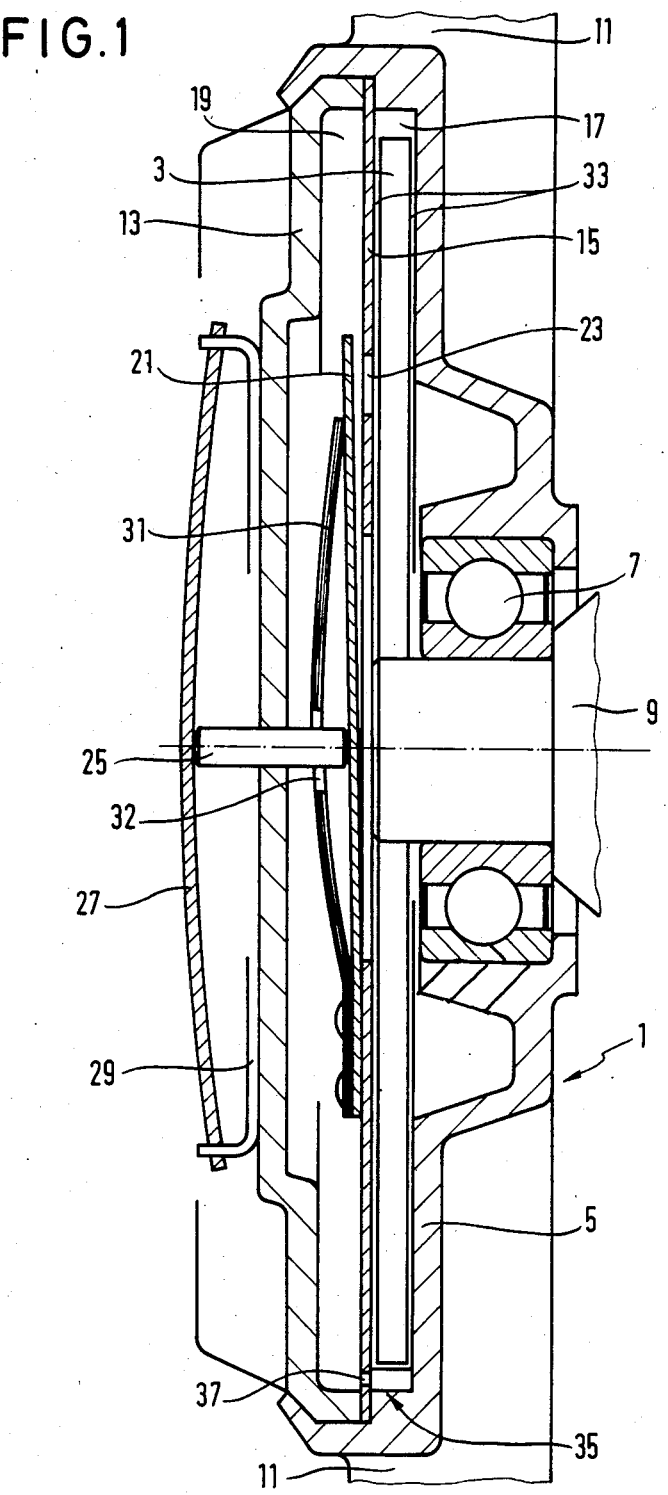
FIG. 1 shows the longitudinal section through a viscous fan coupling in accordance with the invention.

The fluid-friction coupling for a radiator fan of an internal combustion engine as represented in FIG. 1 comprises a housing 1 and a rotor 3 arranged in the housing 1. The housing 1 is mounted at its housing rear wall 5 by means of a rolling bearing 7 rotatably on a drive-input shaft 9. The housing rear wall 5 carries integrally formed-on fan blades 11, which are only partially represented. The housing rear wall 5 together with a housing front wall 13 encloses a sealed chamber which contains viscous fluid and is divided by a partition 15 into a working chamber 17 and a reservoir chamber 19. The working chamber 17 is defined by the housing rear wall 5 and the partition 15 and the reservoir chamber 19 is defined by the housing front wall 13 and the partition 15. The rotor 3 is arranged in the working chamber 17 and is non-rotatably connected with the drive shaft 9. In the reservoir chamber 19 a valve lever 21 is fitted on the partition 15 and can open or close a valve opening 23 in the partition 15. The valve lever 21 is initially stressed in the opening direction. An actuating pin 25 is axially displaceably guided in the housing front wall 13 and transmits to the valve lever 21 the movement of a temperature-sensitive control element in the form of a bimetallic element 27. The bimetallic element 27 is secured to a holder 29 outside the housing 1 at a distance from the housing front wall 13. Between the valve lever 21 and the housing front wall 13 there is arranged a further temperature-sensitive control element in the form of a bimetallic element 31 which has substantially the elongated configuration of the valve lever 21. The bimetallic element 23 is provided with an opening 32 for the passage of the actuating pin 25 and is secured together with the valve lever 21 to the partition 15.

The principle of the manner of operation of this viscous fan coupling is as follows:

In the working chamber 17 the rotor 3 with the housing rear wall 5 on the one part and the partition 15 on the other part forms mutually opposite shearing surface gaps 33. If the shear gaps 33 contain viscous fluid, a specific torque is transmitted by the rotor 3 to the housing 1, whereby the fan blades 11 are driven. The force transmission through the shear forces of the viscous fluid can be adjusted, when the viscous fan coupling is fully engaged, so that the rotation rate of the fan blades 11 does not exceed a pre-determined value, not even if the drive-input rotation rate of the drive-input shaft 9 rises appreciably above this pre-determined value. In this way for example the noise generation of the fan blades and their power consumption are limited. A pump device 35, for example in the form of a protuberance or nose, which in relative rotation of the rotor 3 and the housing 1 continuously pumps viscous fluid through an opening 37 in the partition 15 out of the working chamber 17 into the reservoir chamber 19, is arranged in the radially outer region of the working chamber 17. The torque transmission of the viscous fan coupling is controlled by controlling the inflow of viscous fluid from the reservoir chamber 19 through the valve opening 23 to the shear gaps 33. The inflow is controlled by the bimetallic element 27 through the actuating pin 25 and the valve lever 21. The bimetallic element 27 is exposed to the cooling air coming from the internal combustion engine radiator and flexes more as the temperature rises, so that the valve opening 23 is cleared and the fan blades 11 are driven. As the temperature drops the bimetallic element 27 straightens, so that the valve opening 23 is partially or wholly covered. Since the pump device 35 works constantly when there is relative rotation between rotor 3 and housing 1, thus the working chamber 17 is pumped empty and torque transmission is interrupted.

To this extent the function of the viscous fan coupling corresponds to the prior art as known for example from DE-A- No. 2,803,975. Now problems arise firstly from the desire to keep the maximum rotation rate of the fan blades 11 relatively low at maximum torque transmission and nextly from the relatively high rated rotation speed of the internal combustion engine. If the completely engaged viscous fan coupling is operated at high engine rotation rates for a lengthy time, the high slip then occurring between the rotor 3 and the housing 1 leads to great heat generation. In this way the fan coupling itself can be strongly heated, which is undesired since the viscosity of the viscous fluid is reduced by the great heating, whereby its capacity for transmitting torques is impaired. Furthermore the life of the viscous fluid is greatly shortened by these temperature peaks. All the materials utilised for the fan coupling would have to be suitable for these high maximum temperatures. The gap width of the shear gaps 33 cannot be maintained exactly, since the ordinarily utilised rolling bearing 7 gains greater play in running in the case of major temperature differences between its outer and inner race rings.

In order to avoid these problems the further bimetallic element 31 is provided in the reservoir chamber 19 between the housing front wall 13 and the valve lever 21. It is exposed directly to the temperature prevailing in the interior of the viscous fan coupling. In the normal temperature range for the fan coupling, that is both in the disengaged condition and with the fan coupling fully engaged, the bimetallic element 31 will rest with its free end, by reason of its inherent tension, on the housing front wall 13, or at least will be at such a distance from the valve lever 21 that the latter is not hindered in its function. Only if the working temperature of the viscous fan coupling rises beyond a pre-determined value will the bimetallic element 31 load the valve lever 21 in the direction towards the partition 15 and thus narrow the valve opening 23. Thus the torque transmission capacity of the viscous fan coupling is reduced. While in this case the slip increases, the power loss which generates the internal temperature is however greatly reduced. A state of equilibrium establishes itself in which the fan power, while reduced, is not completely suppressed, so that on the one hand a cooling air flow is still generated and on the other hand the inherent heating is reduced.

Figure 2:
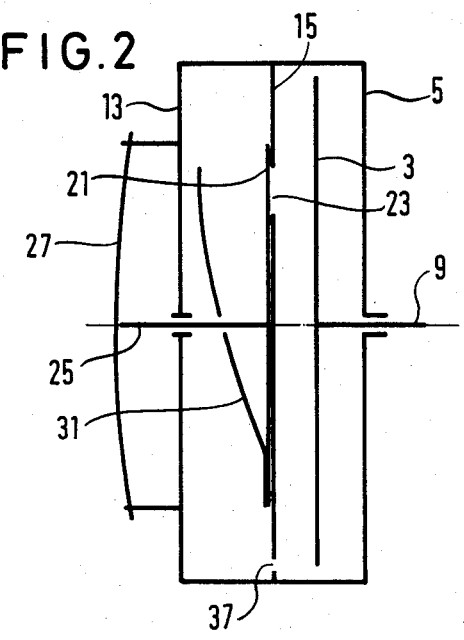
FIGS. 2, 3 and 4 show representations in principle of different operating conditions of the coupling according to FIG. 1.
Figure 3:
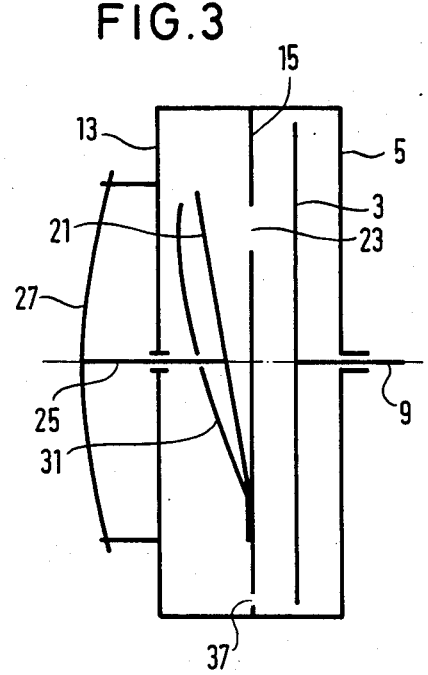
Figure 4:
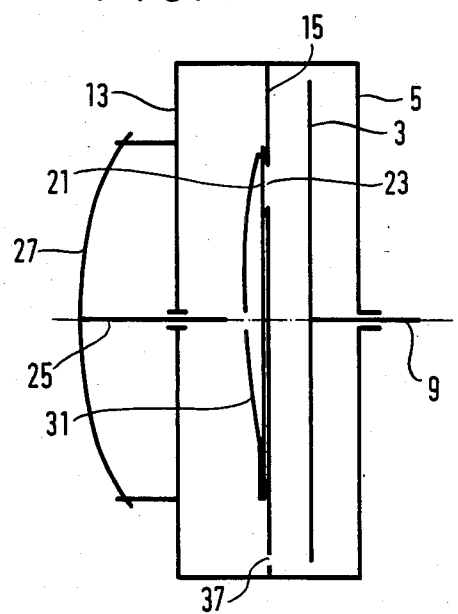

FIGS. 2 to 4 show diagrammatically different operational positions of the two bimetallic elements 27 and 31. In FIG. 2 the fan coupling is illustrated in the completely disengaged condition. The bimetallic element 27 is only slightly subject to the action of the cooling air coming from the radiator, so that it retains its substantially straight position and through the actuating pin 25 holds the valve lever 21 in abutment on the partition 15 and closes the valve opening 23. The force transmission between rotor 3 and the housing 1 is thus suppressed. The temperature in the interior of the fan coupling is so low that the bimetallic element 31 also occupies its basic position, in that it nearly lies on the interior of the front wall 13 of the housing and does not influence the valve lever 21.

FIG. 3 shows the fully engaged operating condition of the viscous fan coupling. Due to the temperature of the cooling air the bimetallic element 27 is strongly flexed forward. By reason of its own initial stress the valve lever 21 opens the valve opening 23, so that viscous fluid can flow from the reservoir chamber 19 into the working chamber 17 and the fan blades 11 are driven with the predetermined transmission power.

FIG. 4 shows the operating condition which is established when the viscous fan coupling, in the fully engaged condition according to FIG. 3, is driven at especially high drive rotation rates over a specific period. With rising temperature of the fan coupling the bimetallic element moves in the direction towards the valve opening 23. The bimetallic element presses the valve lever 21 towards the valve opening 23 and reduces the quantity of throughflow of viscous fluid through the valve opening 23. The reduction of the transmitted torque involved therewith reduces the power loss, so that a state of equilibrium can establish itself.

While a specific embodiment of the invention has been shown and described in detail to illustrate the application of the inventive principles, it will be understood that the invention may be embodied otherwise without departing from such principles.

I claim:
1. Fluid-friction coupling for a cooling fan of an internal combustion engine, comprising:
   (a) a housing which encloses a working chamber at least partially filled with viscous fluid,
   (b) a rotor arranged in the working chamber and rotatable in relation to the housing,
   (c) shearing surfaces located partly on the housing and partly on the rotor, which surfaces on the housing lie opposite to the surfaces on the rotor in the working chamber, forming shear gaps,
   (d) a first torque control device responding to the working temperature of the internal combustion engine, which device with increasing temperature raises the torque transmitted between the shearing surfaces of the housing and the rotor,
   (e) a second torque control device responding to the working temperature of the fluid-friction coupling, which device with rising temperature reduces the torque transmitted between the shearing surfaces of the housing and of the rotor independently of the first torque control device above a predetermined value of the working temperature of the fluid-friction coupling; and
   (f) the housing contains a reservoir chamber for viscous fluid which is separated from the working chamber by a partition, a pump device being provided which is operative on relative rotation of the housing and of the rotor and delivers the viscous fluid out of the working chamber into the reservoir chamber in the relative movement, while the reservoir chamber is connected with the working chamber through a valve device which controls the flow of the viscous fluid from the reservoir chamber to the working chamber, wherein the first torque control device opens the valve device with rising temperature and the second torque control device closes the valve device with rising temperature above a predetermined value.

2. Fluid-friction coupling according to claim 1, wherein the first torque control device comprises a first bimetallic element arranged outside the housing and controlling the valve device and the second torque control device comprises a second bimetallic element arranged within the housing and controlling the valve device.

3. Fluid-friction coupling according to claim 2, wherein the valve device comprises a valve opening in the partition and a valve lever arranged in the reservoir chamber for closing the valve opening and wherein the two bimetallic elements commonly control the valve lever.

4. Fluid-friction coupling according to claim 3, wherein the first bimetallic element acts, through a pin displaceably penetrating the housing, in such a way upon the valve lever that with rising temperature the valve opening is enlarged and with falling temperature it is reduced, and wherein the second bimetallic element is arranged in the reservoir chamber and acts upon the valve lever in such a way that when the temperature increases above the pre-determined temperature value the valve opening is reduced an with falling temperature it is enlarged again.

5. Fluid-friction coupling according to claim 4, wherein the valve lever is resiliently initially stressed into its position opening the valve opening and in that the second bimetallic element is operationally uncoupled from the valve lever at temperatures below the pre-determined temperature value.

6. Fluid-friction coupling according to claim 5, wherein the valve lever and the second bimetallic element have elongated form and are secured in common to the partition, lying one above the other, at their end remote from the valve opening.

7. Fluid-friction coupling according to claim 4, wherein the second bimetallic element is arranged between the valve lever and the first bimetallic element and in that the pin passes through an opening of the second bimetallic element.

* * * * *